United States Patent
Craig

(10) Patent No.: US 7,249,982 B1
(45) Date of Patent: Jul. 31, 2007

(54) OBSTRUCTION ASSEMBLY FOR USE WITH DISCONNECTABLE JOINTS AND METHODS OF USING THE SAME

(75) Inventor: Douglas Craig, Manalapan, NJ (US)

(73) Assignee: Richards Manufacturing Co., Irvington, NJ (US)

(*) Notice: Subject to any disclaimer, the term of this patent is extended or adjusted under 35 U.S.C. 154(b) by 0 days.

(21) Appl. No.: 11/403,762

(22) Filed: Apr. 13, 2006

(51) Int. Cl.
*H01R 4/36* (2006.01)

(52) U.S. Cl. .................................... 439/810
(58) Field of Classification Search ........... 439/810, 439/475; 411/176, 973, 169
See application file for complete search history.

(56) References Cited

U.S. PATENT DOCUMENTS

| 4,436,467 A | * | 3/1984 | Larsson et al. .............. 411/34 |
| 4,820,096 A | * | 4/1989 | Knight ...................... 411/169 |
| 4,968,261 A | * | 11/1990 | Mizunuma ................ 439/108 |
| 5,092,723 A | * | 3/1992 | Compton et al. ........... 411/166 |
| 5,727,820 A | * | 3/1998 | Thompson ............... 285/139.2 |
| 6,884,124 B1 | * | 4/2005 | Luzzi ........................ 439/810 |

* cited by examiner

*Primary Examiner*—Tulsidas C. Patel
*Assistant Examiner*—Phuongchi Nguyen
(74) *Attorney, Agent, or Firm*—Stroock & Stroock & Lavan LLP

(57) ABSTRACT

An obstruction assembly for use in connecting a cable to a disconnectable joint is provided, wherein the connection is to be covered by a sleeve. The obstruction assembly includes a shear bolt having a torque head portion and a main bolt portion, the torque head portion designed to at least partially detach from the main bolt portion at a predetermined torque, and wherein the main bolt portion is designed to connect a cable to a disconnectable joint. The obstruction assembly also includes an obstruction piece having a projection extending away from the main bolt portion a sufficient distance so as to inhibit the placement of a sleeve on the connection between the cable and the disconnectable joint. Preferably, the obstruction piece is removable, in whole or in part, after the torque head portion is at least partially removed from the main bolt portion, such that the sleeve can be properly positioned on the joint.

4 Claims, 8 Drawing Sheets

OBSTRUCTION ASSEMBLY FOR USE WITH DISCONNECTABLE JOINTS AND METHODS OF USING THE SAME

TECHNICAL FIELD OF THE INVENTION

The present invention relates to an improved obstruction assembly, and, in particular, an obstruction assembly having a shear bolt for use with disconnectable electrical joints typically used in power feeder applications. More specifically, the present invention relates to an obstruction assembly for use with disconnectable joints that connect cable segments that require multiple joints for each application.

BACKGROUND OF THE INVENTION

Disconnectable joints are typically used in power feeder applications. Such applications typically comprise three phases, requiring three joints for each jointing application. Thus, in a straight joint there are six bolts that must be hand tightened and subsequently tightened to the appropriate torque. For a tap configuration, a "Y" joint is used, requiring nine bolts. Finally, in a 4-way configuration an "H" joint is used, requiring a total of twelve bolts.

Installation of the joints can be difficult, because every bolt must be hand-tightened and subsequently torqued, using conventional methods commonly known in the art, to ensure proper connection. In a typical installation, in order to ensure proper alignment of the articles being connected, for example, cables, lugs and buses, the splicer must hand-tighten each bolt, and upon verifying the joint alignment, torque the bolts to 50 to 60 foot-pounds. Once the bolts are tightened to the appropriate torque, the splicer can then slide sleeves into place to cover the bolts and seal the connections.

There are many problems with the currently used methods and joints. First, the splicing procedure is typically performed in manholes or in otherwise extremely confined conditions, limiting the freedom of motion of the splicer. Additionally, when the "Y" or "H" joints are used, half of the bolts must be attached from the underside of the joint, thereby rendering the installation even more difficult. Also, if the cables are located on the lower racks, the splicer may need to work on his knees, further complicating the splicing procedure. Furthermore, a torque tool, such as a torque wrench, is needed to torque the bolts. These torque tools, however, may be difficult to maneuver in the confined space in which the splicer is operating. Given many of the difficulties in attaching the bolts, in many instances the splicer either fails to do the final torqueing operation or does not torque the bolts to the correct torque, creating a potential failure point in the joint.

One solution was provided by U.S. Pat. No. 6,884,124 to Luzzi, which provides a barrier head bolt that prevents the sleeve from being positioned until after the bolt achieves proper torque, ensuring proper installation. The torque head portion extends sufficiently from the main bolt portion which connects the articles to physically block the sleeve from being applied. Once the proper torque is achieved, the torque head portion shears off and the sleeve can be applied. However, every system must use specialized bolts such a barrier head bolt, which is a proprietary product under the '124 patent, in order to obtain the result desired.

In light of the shortcomings of the conventional methods and applications known in the art, it is desirable to provide a device that ensures proper tightening of the final assembly of the joint and/or which eliminates the need for the torque tool or specialized bolts.

SUMMARY OF THE INVENTION

The present invention relates to a novel obstruction assembly that can be used in power feeder applications, including, for example, straight joints, "Y" joints, and "H" joints. In particular, the present invention is directed towards an improved obstruction assembly for use with a disconnectable joint, wherein the obstruction assembly comprises a shear bolt having a main bolt portion and a torque head portion, the obstruction assembly having an obstruction piece that projects above the torque head portion of the bolt a sufficient distance so as to inhibit or prevent the application of a joint sleeve. In a preferred embodiment, the joint sleeve cannot be properly positioned without first removing at least a portion of the obstruction piece. Preferably, the obstruction piece is wholly or partially removed after shearing off at least a portion of the torque head portion. In an alternate embodiment, the obstruction piece is removable from the shear bolt without first shearing off the torque head portion. In either embodiment, the invention can substantially ensure that the joint is properly tightened prior to permitting application of the joint sleeve.

In particular, the present invention relates to an improved obstruction assembly having a shear bolt and an obstruction piece, the obstruction assembly designed and constructed so as to ensure that the joint bolts are tightened to the proper torque before the joint sleeve can be placed on the joint itself, thus eliminating and/or reducing the potential for operator error. By positioning the obstruction piece in such a manner as to preferably ensure that the torque head portion is sheared off prior to removing the obstruction piece and subsequently positioning the joint sleeve, the present invention can confirm that the bolts are tightened properly, which ensures proper installation.

The present invention is also related to an improved obstruction assembly that simplifies the installation process by using more conventional shear bolts and by eliminating the need for a torque tool. In particular, the present invention overcomes shortcomings of the prior art in that it permits use of more conventional shear bolts and also in that it allows the splicer to confirm the torque of the bolts without the use of a torque tool by providing a shear bolt with a torque head that will shear off when a predetermined torque level is reached.

Thus, it is an object of the present invention to provide an improved obstruction assembly having a shear bolt and obstruction piece for use with a disconnectable joint and a method of installing the same.

Also, it is an object of the present invention to provide an improved obstruction assembly for use with a disconnectable joint that can confirm the required torque of the bolt is obtained, without the use of a specialized or extended height shear bolt or the use of a torque tool, prior to complete installation of the joint, and a method of installing the same.

Further, it is an object of the present invention to provide an improved method of installing a disconnectable joint that can eliminate the need for a torque tool without sacrificing accuracy and preventing application of the joint sleeve prior to proper installation of the bolt.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF A PREFERRED EMBODIMENT OF THE INVENTION

Figure 1A:
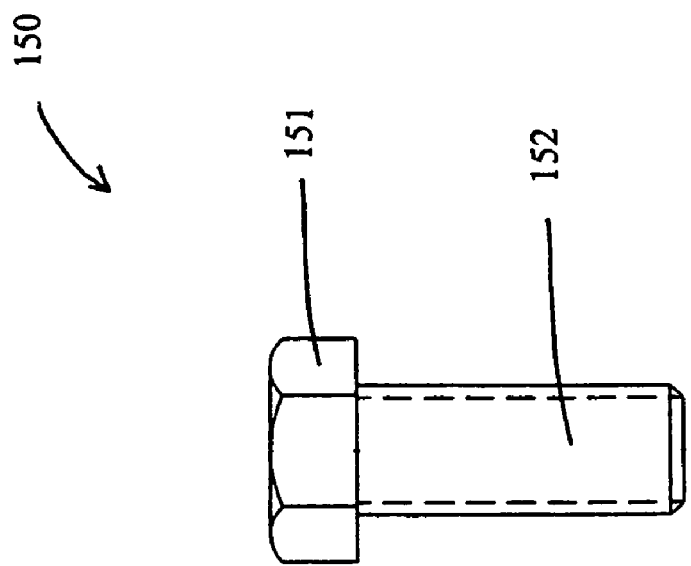
FIG. 1A is a front view of a prior art bolt for use with a disconnectable joint.
Figure 1B:
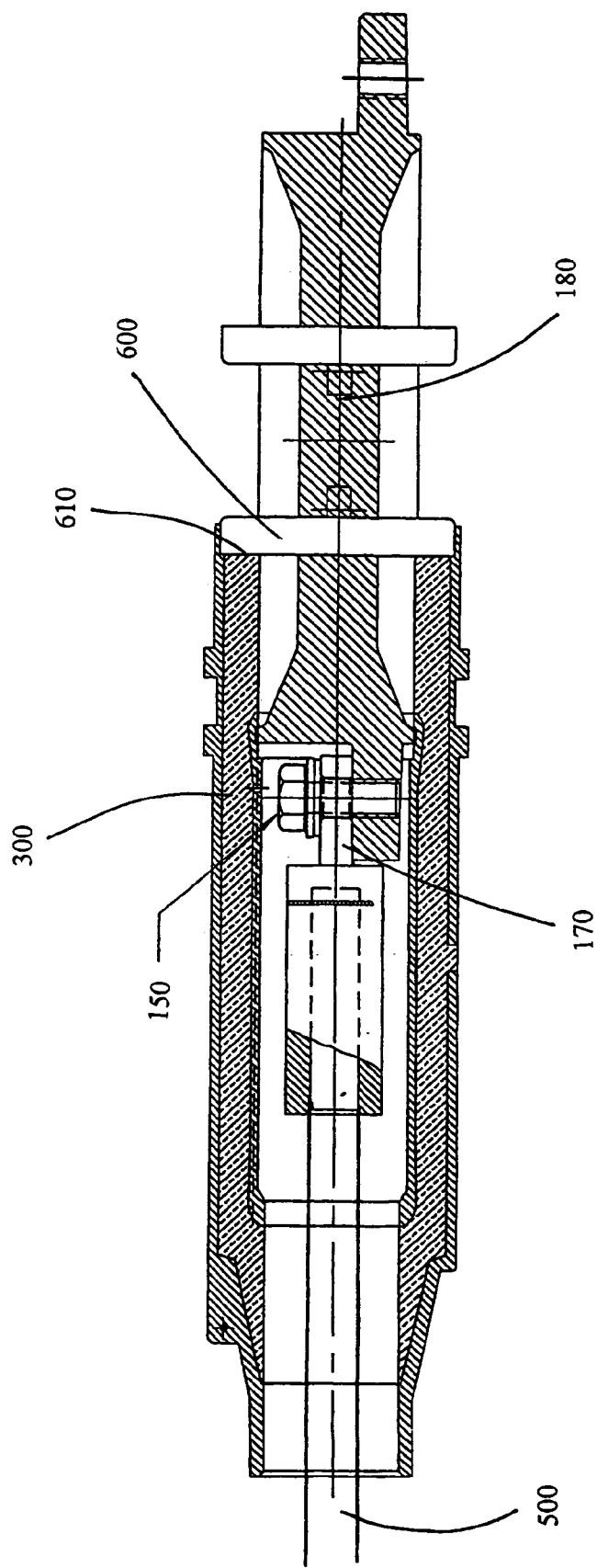
FIG. 1B is a cross-sectional view of a prior art joint including a joint sleeve with the prior art bolt installed therein.

FIG. 1A depicts the prior art bolts typically used to connect disconnectable joints. As seen in FIG. 1A, bolt 150 generally comprises a head portion 151 that is flat and hexagonal, and a threaded shaft portion 152. FIG. 1B shows a disconnectable "I" (or straight) joint 180, attached to the lug 170 of cable 500 via a prior art bolt 150, with a sleeve 300 fitted into place over the connection. According to a method known in the art, to accomplish the connection, sleeve 300 is first placed over the cable 500, then bolt 150 is used to connect the joint 180 to the lug 170 attached to the cable 500. To ensure proper functioning, bolt 150 is generally tightened to a pre-set torque, for example 50 to 60 foot-pounds. Once properly tightened, joint sleeve 300 is slid over the connection at bolt 150 until a leading end 610 of sleeve 300 mates with sleeve mating portion 600 of joint 180.

As described above, given the difficulties of making the joint connection, bolt 150 is often not tightened to the proper torque. As seen in FIG. 1B, it is possible to slide sleeve 300 over prior art bolt 150 and make the contact with sleeve mating portion 600 regardless of whether bolt 150 has been properly tightened. In fact, sleeve 300 could be slid over the connection at bolt 150 even if bolt 150 were only hand tightened. The obstruction assembly of the present invention is directed towards eliminating and/or reducing this potential failure point on the joint system.

Figure 2:
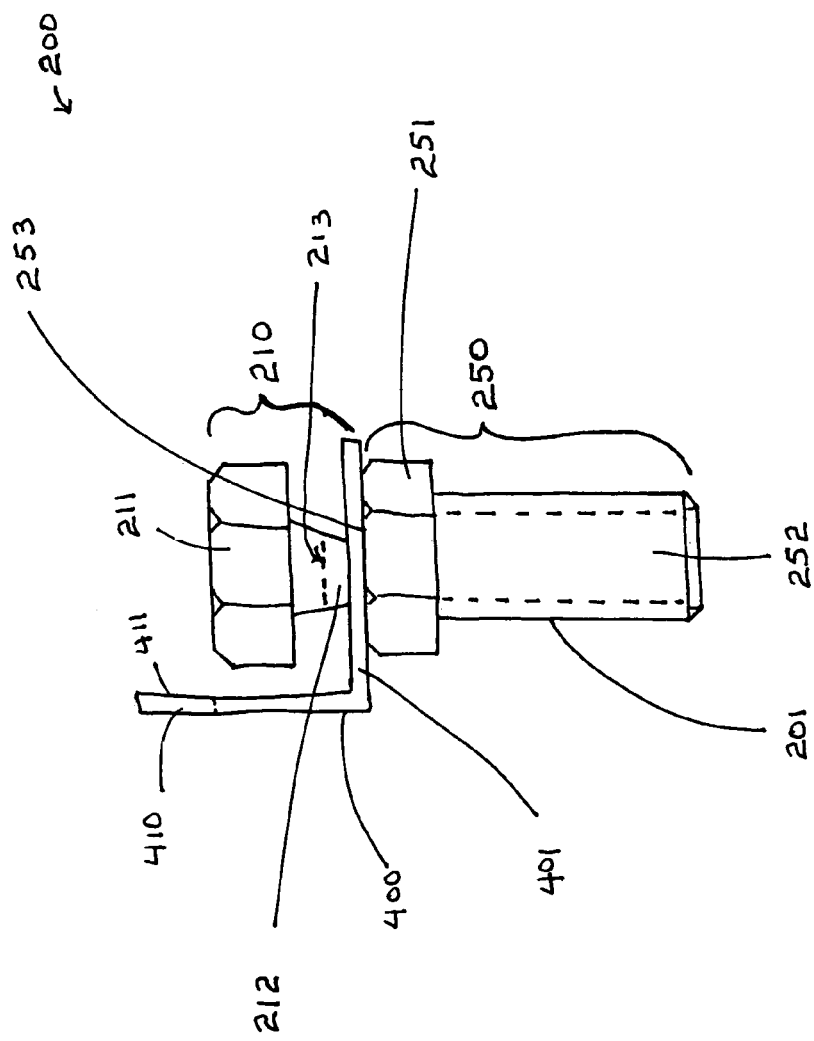
FIG. 2 is a front view of the improved obstruction assembly according to an embodiment of the present invention.

FIG. 2 shows an embodiment of the improved obstruction assembly 200 of the present invention. As seen in FIG. 2, the improved obstruction assembly 200 comprises a shear bolt 201 having a torque head portion 210, which protrudes from a main bolt portion 250, and an obstruction piece 400 having a projection 410 extending away from main bolt portion 250 at a predetermined distance and extending above torque head portion 210 a sufficient distance to achieve its intended purpose. In a preferred embodiment, main bolt portion 250 comprises a head portion 251 and a threaded shaft portion 252, with the head portion 251 and shaft portion 252 generally designed to have similar and/or the same dimensions as prior art bolt 150, in particular with respect to length and width, to facilitate the use of obstruction assembly 200 in pre-existing joint connections. In a preferred embodiment, shear bolt 201 is a conventional shear bolt.

Because main bolt portion 250 preferably has the same length as prior art bolt 150, obstruction assembly 200, which includes obstruction piece 400, is generally longer than the prior art bolt 150. However, in a preferred embodiment, shear bolt 201 of the present invention is shorter than the barrier head bolt disclosed in U.S. Pat. No. 6,884,124, and further is short enough that torque head portion 210 would not by itself prevent positioning of the sleeve over the connection. Torque head portion 210 and main bolt portion 250 can comprise a single integrated piece or separate pieces that are joined to form an integrated shear bolt 201. According to a preferred embodiment of the invention, obstruction piece 400 (or a portion thereof) is positioned or held in place between torque head portion 210 and head portion 251.

Figure 4:
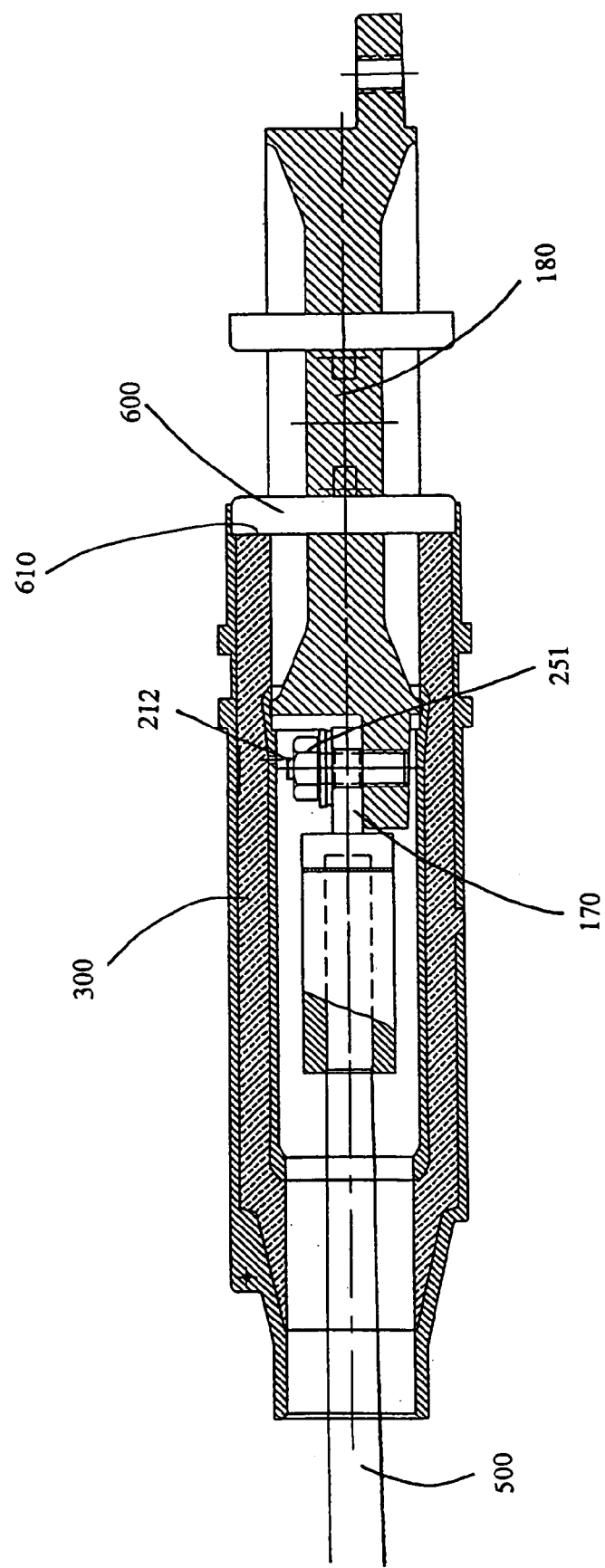
FIG. 4 is a cross-sectional view of the improved obstruction assembly and joint according to an embodiment of the present invention after the torque head portion is sheared off and after the obstruction piece has been removed and the joint sleeve is in place.

As seen in FIG. 2, torque head portion 210 generally comprises an head portion 211 and a stem portion 212. In a preferred embodiment, head portion 211 and stem portion 212 are formed of a single integrated piece, while in an alternative embodiment head portion 211 and stem portion 212 are formed as separate pieces that are joined together. In a preferred embodiment stem portion 212 extends from surface 253 of head portion 251 of main bolt portion 250. Stem portion 212 is designed such that the head portion 211 of shear bolt 201 will break off from the main bolt portion 250 when a pre-determined amount of torque is applied to the head portion 211. Stem portion 212 may be designed to remain fully attached to head portion 211 or main bolt portion 250, or remain partially attached to either or both head portion 211 and main bolt portion 250, as a matter of application specific to design choice. Torque head portion 210 and main bolt portion 250 can be formed of the same material or different materials, as a matter of application specific design choice. As an example, FIG. 4 shows an embodiment of stem portion 212 split at approximately a midway point between head portion 211 and main bolt portion 250. In a preferred embodiment of the present invention, stem portion 212 is sheared off at a predetermined location by creating an undercut 213 in the stem portion 212.

In a preferred embodiment, stem portion 212 is constructed and designed to have a thinner width than the width of shaft portion 252 of main bolt portion 250. In a preferred embodiment, the stem portion 212 is designed to shear off at approximately between 50 to 60 foot-pounds of torque. Although FIG. 2 shows stem portion 212 having a generally cylindrical shape with differing diameters, the present invention is not limited to any particular shape or length so long as a part of, or all of, torque head portion 210 will shear off at the pre-determined amount of torque, and so long as obstruction piece 400 is maintained in position to extend from main bolt portion 250 a sufficient distance to achieve its intended purpose as described and claimed herein.

Torque head portion 210 can comprise a hexagonal shape and the upper surface of head portion 211 can be flat, making it suitable for tightening or loosening using conventional tools available in the market. Whereas the width of head portion 211 is shown as being equal to the width of head portion 251, the width of head portion 211 can be greater or smaller without departing from the scope of the present invention.

Figure 3:
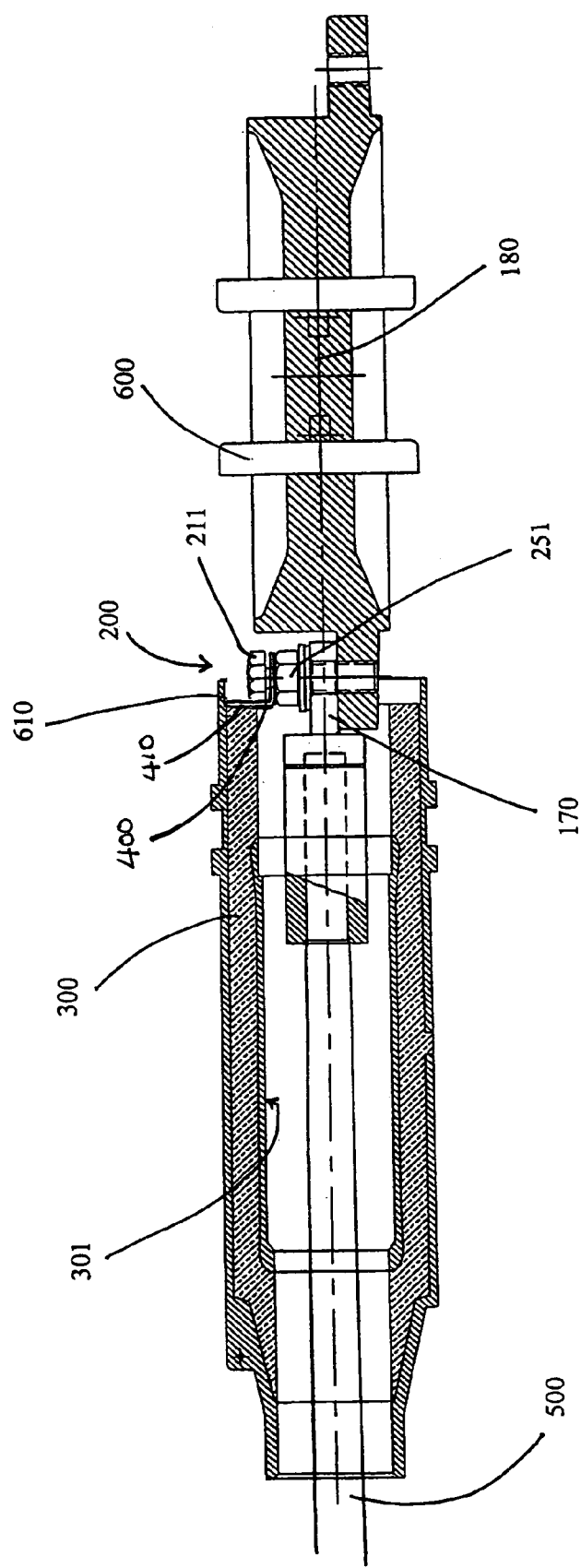
FIG. 3 is a cross-sectional view of the improved obstruction assembly of the present invention installed within a disconnectable joint before the torque head portion has been sheared off and before the obstruction piece has been removed, demonstrating that the joint sleeve cannot be fit into place while the obstruction piece is still in position.

As described in more detail below, obstruction assembly 200 is preferably designed to ensure that main bolt portion 250 is tightened to the proper pre-determined torque prior to completing the joint installation. That is, the improved obstruction assembly 200 of the present invention is preferably designed to prevent sleeve 300 from being slid into proper position unless and until main bolt portion 250 is properly tightened and obstruction piece 400 is removed. As seen in FIGS. 2 and 3, and as described in more detail below, prior to being removed, projection 410 (or a portion thereof) of obstruction piece 400 (or a part thereof) of obstruction assembly 200 extends beyond inner wall 301 of sleeve 300 a sufficient distance so as to block sleeve 300 from moving any further toward sleeve mating portion 600 of joint 180. Therefore, the full connection cannot be made (i.e., sleeve 300 cannot be fit into proper place) unless and until projection 410 (or a portion thereof) or obstruction piece 400 (or a portion thereof) is removed from shear bolt 201. In a preferred embodiment, projection 410 and/or obstruction piece 400 cannot be removed until head portion 211 is sheared off from main bolt portion 250 by applying the proper pre-determined torque to shear bolt 201.

Figure 5C:
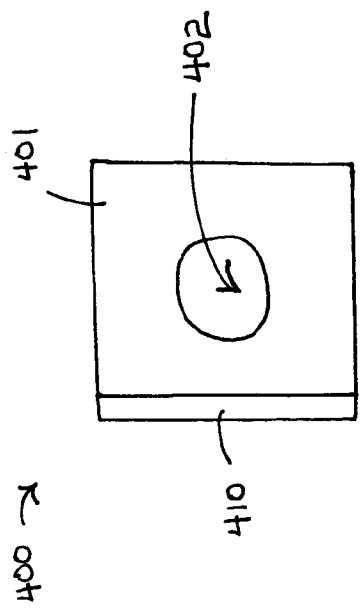
FIG. 5C is a side view of the obstruction piece of FIG. 5A.
Figure 5B:
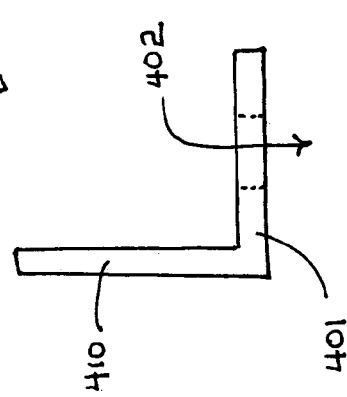
FIG. 5B is a front view of the obstruction piece of FIG. 5A.
Figure 5A:
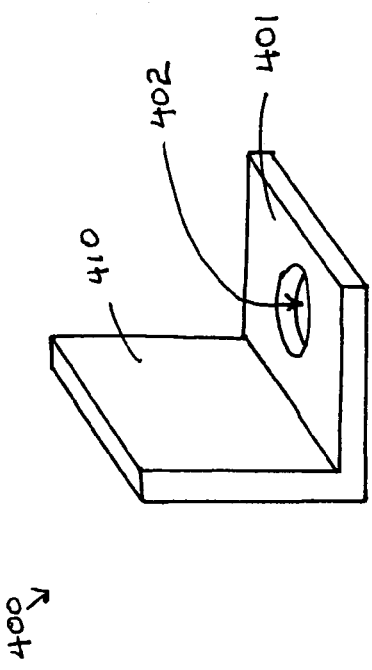
FIG. 5A is a perspective view of the obstruction piece of the improved obstruction assembly according to an embodiment of the present invention.

Reference is made to FIGS. 5-6, wherein two embodiments of obstruction piece 400, 450 are shown. Referring to FIGS. 5A-5C, obstruction piece 400 includes a base 401 having an aperture 402 for receiving stem portion 212 of torque head 210. Aperture 402 is narrower than the width of head portion 211, thereby substantially preventing removal of obstruction piece 400 until after head portion 211 is sheared off. In accordance with a preferred embodiment, obstruction piece 400 is molded around stem portion 212. Alternatively, obstruction piece 400 can be formed independently and then positioned, for example, by attaching multiple pieces to form base 401 around stem portion 212, wrapping an elongated piece around stem portion 212 and solidifying it to prevent unraveling, etc. in order to provide base 401 that is preferably not removable until head portion 211 is sheared off.

Figure 6C:
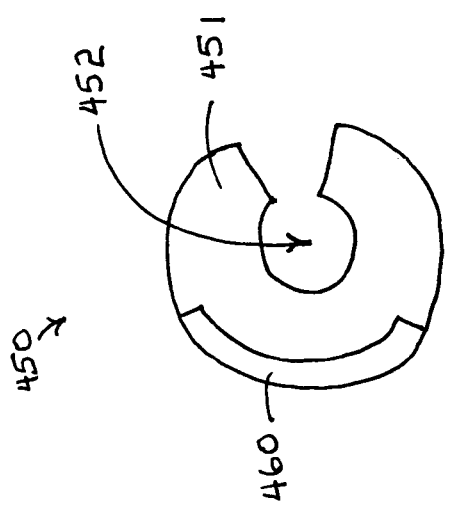
FIG. 6C is a top view of the obstruction piece of FIG. 6A.
Figure 6B:
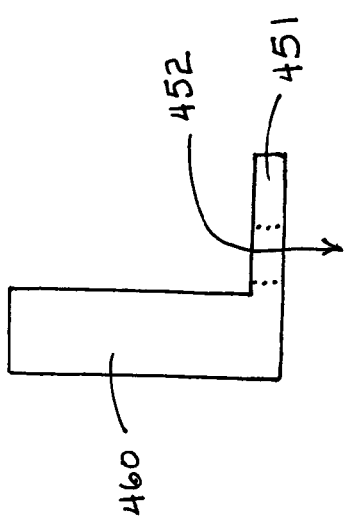
FIG. 6B is a front view of the obstruction piece of FIG. 6A.
Figure 6A:
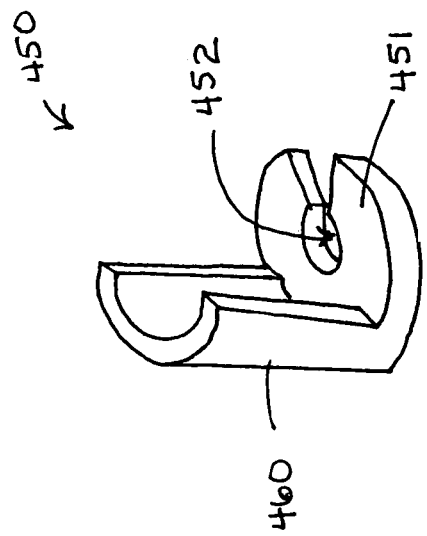
FIG. 6A is a perspective view of the obstruction piece of the improved obstruction assembly according to an embodiment of the present invention.

Referring to FIGS. 6A-6C, an alternate embodiment of obstruction piece 450 includes a base 451 having an aperture 452 for receiving stem portion 212, wherein base 451 includes a slot aperture 452 which can facilitate positioning base 451 of obstruction piece 450 around stem portion 212 of a conventional shear bolt. Preferably, obstruction piece 450 is removably positioned prior to installation of the cable and removed after head portion 211 shears off. Whereas obstruction piece 450 can be removed before head portion 211 shears off, and therefore does not necessarily prevent positioning sleeve 300 over obstruction assembly 200 toward sleeve mating portion 600 prior to head portion 211 shearing off, it can serve as a reminder and permits reuse of obstruction piece 450. Whereas the embodiment of obstruction piece 450 shown can be inserted in place, it is to be understood that obstruction piece 450 can be positioned using other ways, such as wrapping the base around stem 212.

FIGS. 5-6 show base 401, 451 as generally round or square shaped and flat having aperture 402, 452, but it is to be understood that base 401, 451 may be any number of shapes or configurations as a matter of application specific design choice. It is also to be understood that aperture 402, 452 whereas illustrated as a round aperture, can comprise any shape without deviating from the scope of the invention. For example, stem portion 212 and aperture 402, 452 can be substantially rectangular in shape, thereby preventing rotation of obstruction piece 400, 450 during installation of the cable. Similarly, whereas extension 410, 460 have been shown as having a generally rectangular or elongated curved shape, it is to be understood that extension 410, 460 may be any number of shapes or configurations as a matter of application specific design choice. For example, the extension may be one or more rods or any structure extending from base 401, 451, without deviating from the scope of the invention. Obstruction piece 400 can be made of a variety of materials including but not limited to plastic or metal, and can be formed integral with stem portion 212 or as a separate piece as a matter of application specific design choice. Whereas the embodiment of obstruction piece 400, 450 shown can be molded or inserted in place, it is to be understood that obstruction piece 450 can be positioned using any other way, such as either permanently or removably wrapping a flexible base around stem portion 212.

Figure 7B:
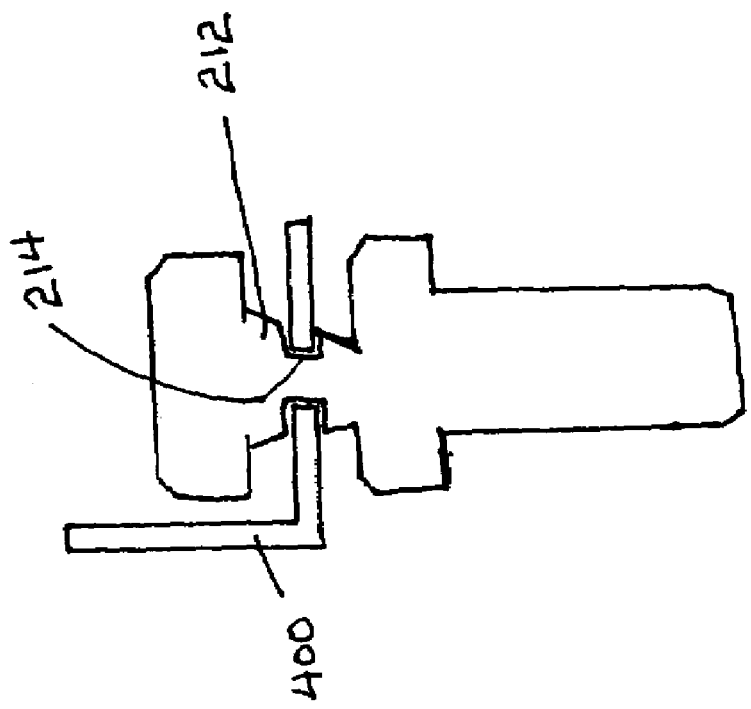
FIG. 7B is a cross-sectional view of the obstruction piece of FIG. 7A.
Figure 7A:
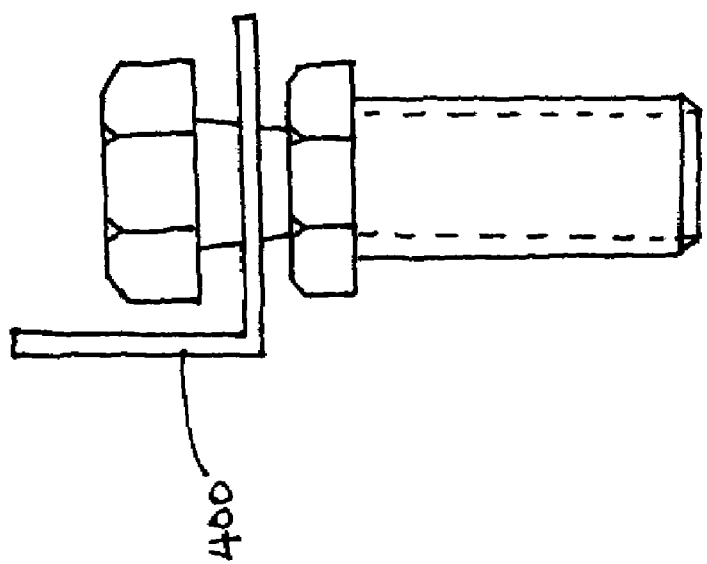
FIG. 7A is a front view of the obstruction piece of the improved obstruction assembly according to an embodiment of the present invention.

FIGS. 7A-B show an embodiment of obstruction assembly 200 in accordance with another embodiment of the invention, wherein stem portion 212 includes a groove 214 for receiving obstruction piece 400. Preferably aperture 402 of obstruction piece 400 is narrower than the outer diameter of groove 214, thereby ensuring that obstruction piece 400 is retained in position. It is to be understood that a removable obstruction piece such as obstruction piece 450 can also utilized without deviating from the scope of the invention.

The installation process of an embodiment of the present invention applied to an "I" joint, in reference to FIGS. 2-4, will now be discussed in more detail. Sleeve 300 is placed over cable 500, and then obstruction assembly 200 is hand tightened in order to connect joint 180 to lug 170 (which is attached to cable 500). Shear bolt 201 is then tightened further by a conventional wrench or other tool. Preferably, shear bolt 201 is tightened via head portion 211. When shear bolt 201 is being tightened, the twisting action requires a certain torque, which represents how tightly shear bolt 201 is being tightened. When main bolt portion 250 is tightened to the required tightness, applying more force to head portion 211 will result in a part or all of torque head portion 210 detaching from main bolt portion 250. After head portion 211 is removed from main bolt portion 250, obstruction piece 400, 450 can be removed. Once torque head portion 210 detaches from main bolt portion 250, main bolt portion 250 is tightened to the proper predetermined torque, and once obstruction piece 400, 450 is removed as needed, sleeve 300 can be slid over main bolt portion 250 toward sleeve mating portion 600. In an alternate embodiment, obstruction piece 400, 450 (or a portion thereof) is removable without first shearing off torque head portion 210. As mentioned above, sleeve 300 cannot be properly positioned until obstruction piece 400, 450 (or a part thereof) is removed. Once removed, sleeve 300 then engages sleeve mating portion 600, preferably via leading end 610, and seals the connection, completing the installation.

In accordance with an embodiment of the invention, obstruction piece 400 is entirely removed after head portion 211 is sheared off. In accordance with another embodiment, however, only a portion of extension 410 of obstruction piece 400 is removed either before or after head portion 211 is removed. For example, extension 410 can include a detachment portion 411 constructed to be detachable from obstruction piece 400 at a position equal to or closer to main bolt portion 250 than the top surface of head portion 211 such that the remaining portion of extension is at most the height of shear bolt 201 before head portion 211 is sheared off. Once the detachment portion 411 is detached, sleeve 300 can be slid over the remaining obstruction assembly 200 in order to seal the connection. Alternatively, detachment portion 411 does not need to be physically removed from obstruction piece 400, but rather, can be folded or somehow displaced toward main bolt portion 250 to reduce the overall length of obstruction assembly 200 to permit sleeve 300 to be slid over obstruction assembly 200 to seal the connection.

Thus, as described above, the improved bolt according to a preferred embodiment of the present invention, by providing an obstacle piece, ensures that the connection is tightened to the proper torque before the sleeve can be positioned in its proper place, thereby eliminating a potential serious failure point on the connection. The bolt of the present invention also eliminates the use of a specialized torque tool, thus further providing benefits and advantages of prior art bolts for use in connection with disconnectable joints.

In the foregoing description, the device and the method of the present invention have been described with reference to specific embodiments. It is to be understood and expected that variations in the principles of the device and method herein disclosed may be made by one of ordinary skill in the art and it is intended that such modifications, changes, and substitutions are to be included within the scope of the present invention as set forth in the appended claims. For example, whereas the exemplary embodiments described herein comprise a separate obstruction piece, it is to be understood that obstruction piece can be integrally formed with or attached to either torque head portion 210 or the main bolt portion 250 without deviating from the scope of the invention. For example, the obstruction piece can comprise the main bolt head portion 251 and a projecting extending therefrom, for example, a projection that extends from main bolt head portion 251 or from either head portion 211 or stem portion 212 of torque head portion 211, as a matter of application specific to design choice. The specification and the drawings are accordingly to be regarded in an illustrative, rather than in a restrictive sense.

The invention claimed is:

1. An obstruction assembly for use in connecting a cable to a disconnectable joint, and wherein the connection is to be covered by a sleeve, the obstruction assembly comprising:
   a shear bolt having a torque head portion and a main bolt portion, wherein the torque head portion comprises a head portion and a stem portion, torque head portion designed to at least partially detach from the main bolt portion at a predetermined torque, and wherein the main bolt portion is designed to connect a cable to a disconnectable joint;
   an obstruction piece having a projection extending away from the main bolt portion a sufficient distance so as to inhibit the placement of a sleeve on the connection between the cable and the disconnectable joint; and
   the obstruction piece being designed and constructed to be removable, in whole or in part, only after the torque head portion is at least partially removed from the main bolt portion, such that the sleeve can be properly positioned on the joint.

2. An obstruction assembly for use in connecting a cable to a disconnectable joint, and wherein the connection is to be covered by a sleeve, the obstruction assembly comprising:
   a shear bolt having a torque head portion and a main bolt portion, wherein the torque head portion comprises a head portion and a stem portion, torque head portion designed to at least partially detach from the main bolt portion at a predetermined torque, and wherein the main bolt portion is designed to connect a cable to a disconnectable joint;
   an obstruction piece having a projection extending away from the main bolt portion a sufficient distance so as to inhibit the placement of a sleeve on the connection between the cable and the disconnectable joint; and
   the obstruction piece being designed and constructed to be removable from the main bolt portion, in whole or in part, such that the sleeve can be properly positioned on the joint.

3. An obstruction assembly for use in connecting a cable to a disconnectable joint, and wherein the connection is to be covered by a sleeve, the obstruction assembly comprising:
   a shear bolt having a torque head portion and a main bolt portion, wherein the torque head portion comprises a head portion and a stem portion, torque head portion designed to at least partially detach from the main bolt portion at a predetermined torque, and wherein the main bolt portion is designed to connect a cable to a disconnectable joint;
   an obstruction piece having a projection extending away from the main bolt portion a sufficient distance so as to inhibit the placement of a sleeve on the connection between the cable and the disconnectable joint; and
   the projection being designed and constructed to be removable, adjustable, detachable or deformable, in whole or in part, such that the sleeve can be properly positioned on the joint.

4. A method for connecting a cable to a disconnectable electrical joint wherein the connection is covered by a sleeve, said method comprising:
   positioning a sleeve over a cable;
   providing an obstruction assembly comprising a torque head portion, a main bolt portion and an obstruction piece, the obstruction piece having a projection, wherein the projection extends from the main bolt portion a sufficient distance such that the sleeve cannot be properly positioned while the projection piece is extending the sufficient distance from the main bolt portion;
   joining the cable to a disconnectable joint via the main bolt portion of the obstruction assembly;
   tightening the torque head portion to a predetermined tightness such that at least a portion of the torque head portion detaches from the main bolt portion;
   removing the obstruction piece, in whole or in part, from the main bolt portion; and
   positioning the sleeve over the connection between the cable and the joint.

* * * * *